United States Patent
Hopkins et al.

(12) 
(10) Patent No.: US 6,655,430 B1
(45) Date of Patent: Dec. 2, 2003

(54) LOW PRESSURE TIRE WITH A LOW ANGLE RESTRICTOR BELT

(75) Inventors: William Michael Hopkins, Hudson, OH (US); Lewis Timothy Lukich, Akron, OH (US); Terry John Waibel, Wadsworth, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 186 days.

(21) Appl. No.: 09/710,629

(22) Filed: Nov. 9, 2000

(51) Int. Cl.[7] ............... B60C 9/22; B60C 11/11; B60C 107/02; B60C 121/00
(52) U.S. Cl. .................. 152/209.12; 152/531
(58) Field of Search ............ 152/209.12, 209.13, 152/531

(56) References Cited

U.S. PATENT DOCUMENTS

| | | | |
|---|---|---|---|
| 3,979,536 A | 9/1976 | Neville et al. ............ 428/43 |
| 4,072,550 A | 2/1978 | Stalter, Jr. ............ 156/123 R |
| 4,098,315 A | 7/1978 | Ferrell et al. ............ 152/361 R |
| 4,194,548 A | * 3/1980 | Roger |
| 4,446,902 A | * 5/1984 | Madec et al. |
| 4,791,971 A | * 12/1988 | Shinn |
| 5,337,816 A | * 8/1994 | Bonko et al. |
| 5,435,370 A | 7/1995 | Ahmad et al. ............ 152/550 |
| 5,922,154 A | * 7/1999 | Lowenhaupt et al. |

FOREIGN PATENT DOCUMENTS

| | | | |
|---|---|---|---|
| CA | 876518 | * | 7/1971 |
| JP | 60-143107 | * | 7/1985 |
| SU | 1593980 | * | 9/1990 |
| WO | WO 99/10190 | * | 3/1999 |

* cited by examiner

Primary Examiner—Steven D. Maki
(74) Attorney, Agent, or Firm—David L. King (57) ABSTRACT

A low pressure tire 20 for off road use has a carcass 21 reinforced with carcass plies 22 and a composite structure including a tread 32, a belt or breaker reinforcement 26 and one or more low angle cord reinforced layers 60.

4 Claims, 6 Drawing Sheets

LOW PRESSURE TIRE WITH A LOW ANGLE RESTRICTOR BELT

BACKGROUND OF THE INVENTION

High performance speed rated passenger tires have a tremendous amount of circumferential growth in the tires outside diameter when operated at high speeds. To restrict this growth, low angle circumferential extending cords oriented in the 0° less than 5° range have been wrapped around the tire's belt reinforcing structure. This low angle restrictor belt prevents the growth and keeps the components, including the tread, to be less likely to separate from the underlying carcass.

These tires are generally designed to operate at normally loaded inflation pressures greater than 30 psi, usually 35 psi or more.

At the opposite end of the speed performance end are lawn and tractor tires. These tires in normal working conditions operate at about 25 mph or less, usually much less when actually working in a field. Often in order to increase traction under load, commonly referred to as drawbar traction, the farmer lowers the inflation pressure from 25 psi to about 14 psi.

Lowering the inflation effectively increased the length of the tires contact patch. This increased contact patch means more of the tires elongated lugs are digging into the soil at any given point in the tires contact patch.

As the torque generated by the tractor engine is increased, the tire actually squats causing the sidewalls to lower even further. This creates significant stresses in the belt structure.

The tread lugs typically are inclined at about 45° relative to the tires circumferential centerplane and they extend from each tread shoulder toward the center. The lugs on one tread half are generally similar in size and shape, but oppositely oriented. These are commonly referred to as directional tractor tires having a preferred forward direction of travel.

As the horsepower of tractors increases, the amount of torque generated on the tires also goes up.

We have now reached a point on the tire performance scale wherein we are experiencing a new phenomena wherein the tread lugs in the footprint are actually rolling or being pushed upward into the belt reinforcements.

The object of the present invention is the increase the torque capacity of low pressure off-road tires having low net-to-gross ratios of 30% or less.

Another objective of the present invention is to facilitate low pressure operation of tires for tractors, ATV and the like by reducing stresses caused by such operating conditions.

SUMMARY OF THE INVENTION

A low pressure pneumatic tire for off-road use has a carcass. The carcass has a radially outer crown portion and is reinforced with one or more layers of cord reinforced plies.

The tire has a circumferentially extending tread reinforcement composite structure, including a tread, a belt or breaker reinforcement, and one or more low angle cord reinforced layers.

The tread has a plurality of widely spaced elongated lugs. Each lug has a radial height (h) and a width (w),(w) being less than (h). The tread has a net-to-gross ratio as measured around the circumference of less than 30%. Each lug has a lug length (l) preferably at least four times the lug width (lw), most preferably six times greater than the width (w).

The belt or breaker reinforcement has two or more cord reinforced layers and the cords oriented at an angle of 18° or more relative to the circumferential direction. Preferably the cords of belt or breaker are made of polyester, rayon or even steel.

The low angle cord reinforced layers are interposed between the belt or breaker reinforcement and the tread. Each low angle cord reinforced layer has cords oriented in the 0° to 5° range relative to the circumferential direction. The cords are preferably made of nylon or aramid materials.

In a preferred embodiment the tread lugs are inclined relative to the circumferential direction at an angle equal to or greater than 30°.

In one preferred embodiment of this invention, the tire 20 has an aspect ratio of greater than 95%, preferably 100% or greater, most preferably greater that 100%. The tire 20 has a contact patch when the tire is inflated to less than 16 psi (1.2 bar) and when loaded on a hard flat surface, the contact patch has an axial width X and circumferential length of Y, wherein the ratio of Y/X is at least greater than 1.0. Preferably the contact patch has a leading end and a trailing end; the distance between the leading and trailing end defines the circumferential length Y. The tire 20 when inflated to less than 16 psi (1.2 bar) and normally loaded has a first radial line intersecting the leading end and a second radial line intersecting the trailing end. The tire can have a carcass having one or more radial plies and a belt reinforcing structure between the ply or plies and the tread. Alternatively, the carcass can have two or more bias plies and a breaker structure between the tread and the bias plies.

The tread has a plurality of lugs spaced between a pair of lateral edges. Each lug has a radially outer contact surface area, the sum of the radially outer contact surface areas between the lateral edges as measured around the total circumference of the tire divided by the area between the lateral edges around the total tires circumference is less than 30%, preferably less than 25%.

In another embodiment, the invention is employed in agricultural tires have aspect ratio's in a more conventional range of 60 to 85%. In this case, the composite structure of the tread with widely spaced traction bars, the low angle cord reinforced restrictor ply, the belts and carcass ply all work together in the crown region of the tire to create an elongated highly effective tire footprint for loaded working conditions.

Definitions

"Aspect ratio," means the ratio of its inflated section height to its inflated section width.

"Axial" and "axially" means the lines or directions that are parallel to the axis of rotation of the tire.

"Bead" or "Bead Core" means generally that part of the tire comprising an annular tensile member, the beads are associated with holding the tire to the rim being wrapped by or anchored to ply cords and shaped, with or without other reinforcement elements such as flippers, chippers, apexes or fillers, toe guards and chafers.

"Belt Structure" or Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Breakers or Breaker Reinforcement" is similar to a belt reinforcement, however, the cord layers are generally oriented at about the same angle as the underlying carcass plies; generally, this reinforcing layers are found in bias ply tires.

"Bias Ply tire" means that the reinforcing cords in the carcass ply extend diagonally across the tire from bead-to-bead at about a 25–65° angle with respect to the equatorial plane of the tire, the ply cords running at opposite angles in alternate layers.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction.

"Design Rim" means a rim having a specified configuration and width. For the purposes of this specification, the design rim and design rim width is as specified by the industry standards in effect in the location in which the tire is made. For example, in the United States, the design rims are as specified by the Tire and Rim Association. In Europe, the rims are as specified in the European Tyre and Rim Technical organization—Standards Manual and the term design rim means the same as the standard measurement rims. In Japan, the standard organization is The Japan Automobile Tire Manufacturer's Association.

"Design Rim Width" is the specific commercially available rim width assigned to each tire size and typically is between 75% and 90% of the specific tire's section width.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Inner" means toward the inside of the tire and "outer" means toward its exterior.

"Lateral Edge" means the axially outermost edge of the tread as defined by a plane parallel to the equatorial plane and intersecting the outer ends of the axially outermost traction lugs at the radial height of the inner tread surface.

"Leading" refers to a portion of part of the tread that contacts the ground first, with respect to a series of such parts or portions, during rotation of the tire in the direction of travel.

"Net-to-gross Ratio" means the ratio of the tread contacting surface area of the normally loaded and inflated tire to the total area of the tread, including non-contacting portions such as grooves as measured around the entire circumference of the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Radial" and "radially" means directions radially toward or away from the axis of rotation of the tire.

"Radial Ply Tire" means a belted or circumferentially-restricted pneumatic tire in which the ply cords which extend from bead to bead are laid at cord angles between 65° and 90° with respect to the equatorial plane of the tire.

"Section Height (SH)" means the radial distance from the nominal rim diameter to the outer diameter of the tire at its equatorial plane.

"Section Width (SW)" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Tire Design Load" is the base or reference load assigned to a tire at a specific inflation pressure and service condition; other load-pressure relationships applicable to the tire are based upon that base or reference.

"Trailing" refers to a portion or part of the tread that contacts the ground last, with respect to a series of such parts or portions during rotation of the tire in the direction of travel.

"Tread Arc Width (TAW)" means the width of an arc having its center located on the plane (EP) and which substantially coincides with the radially outermost surfaces of the various traction elements (lugs, blocks, buttons, ribs, etc.) across the lateral or axial width of the tread portions of a tire when the tire is mounted upon its designated rim and inflated to its specified inflation pressure but not subject to any load.

"Tread Width" means the arc length of the tread surface in the axial direction, that is, in a plane parallel to the axis of rotation of the tire.

"Unit tread Pressure" means the radial load borne per unit area (square centimeter or square inch) of the tread surface when the area is in the footprint of the normally inflated and normally loaded tire.

BRIEF DESCRIPTION OF DRAWINGS

The following is a brief description of the drawings in which like parts bear like reference numerals and in which.

DETAILED DESCRIPTION OF THE INVENTION

Figure 2:
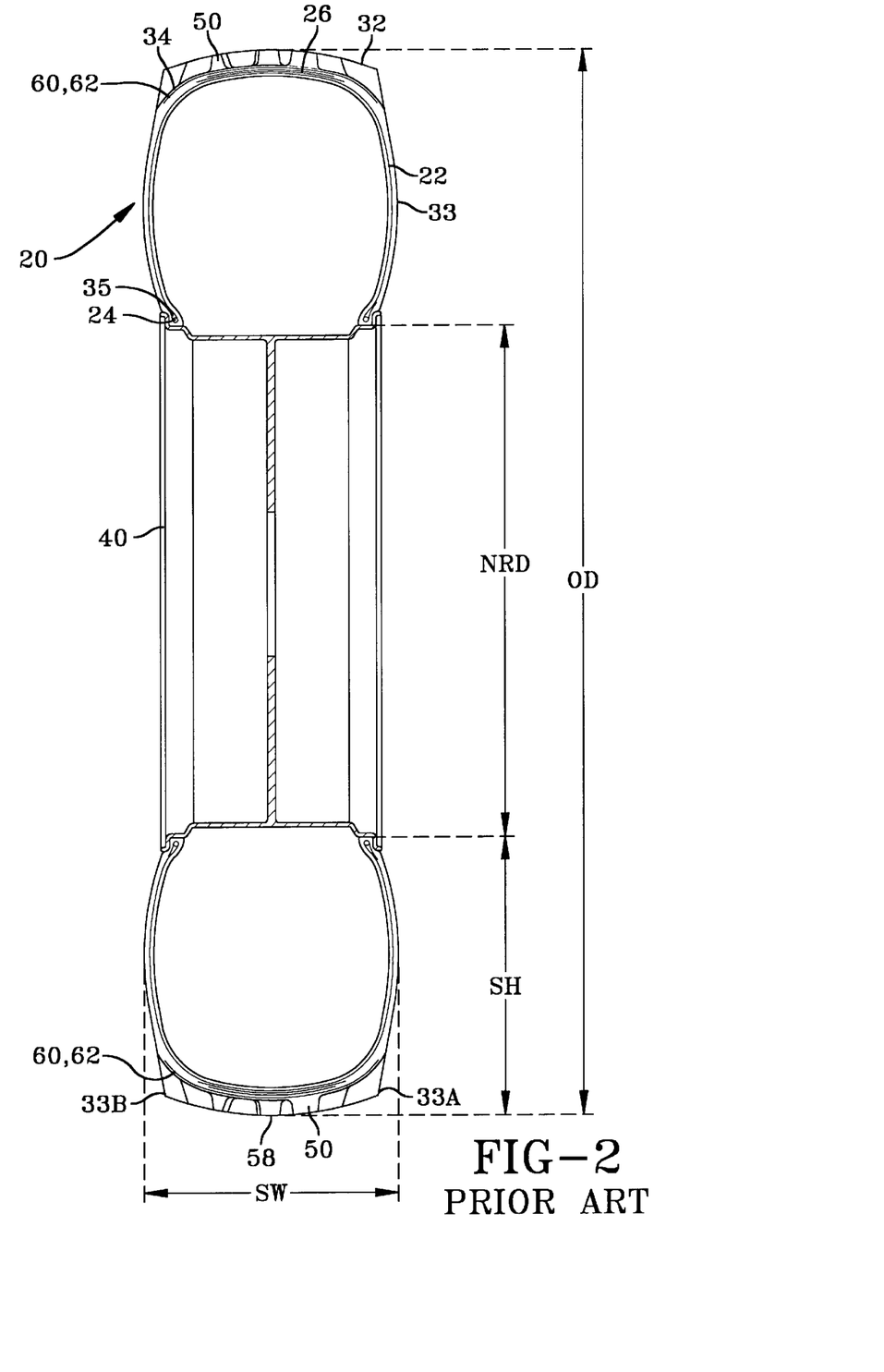
FIG. 2 is a cross sectional view of the tire of FIG. 1.

Now referring to FIG. 2, a tire is shown in cross-sectional view generally as reference numeral 20. The tire has a carcass 21 having one or more carcass plies 22 extending circumferentially about the axis rotation of the tire. As illustrated, the tire preferably has 3 to 4 cord reinforced plies having synthetic nylon or polyester cords. The carcass plies are anchored around a pair of substantially inextensible annular bead cores 24. A belt-reinforcing member 26 has one or more belt or breaker plies disposed radially outward from the carcass plies. Preferably four belts are employed. The belts being of polyester, nylon or aramid cord reinforcement alternatively the cords can be of ultra high tensile monofilament steel cord reinforcement. These belt plies provide reinforcement for the crown region of the tire 20. A circumferentially extending tread 32 is located radially outwardly of the belt reinforcing structure 26. Interposed between the belt plies 26 and the tread 32 is one or more low angle cord reinforced layers 60.

A sidewall portion 33 extends radially inwardly from each axial or lateral tread edge 33A, 33B of the tread to an annular bead portion 35 having the beads 24 located therein. Carcass plies 22 preferably have the cords oriented radially. The number of plies depends on the load carrying requirements of the tire. This tire carcass and belt structure as shown in FIG. 2 is equally applicable for use in any of the embodiments of the present invention. FIGS. 1–3 and 5–7 illustrate high aspect tires made in accordance to one embodiment of the present invention, whereas FIG. 4 illustrate tires having normal aspect ratio made in accordance to the present invention.

Now referring to FIGS. 1–2 and FIGS. 5–7, a tire 20 according to the present invention, is illustrated. The tire 20 according to the present invention has a tread 32. The tread 32 has a first tread edge 33 A and a second tread edge 33 B. Disposed between the tread edges 33A and 33B is an inner tread 34 and a plurality of lugs 50 extending radially outwardly from the inner tread 34. As illustrated in FIG. 2 each lug 50 has a radially outer surface 58, the total area of these surfaces 58 define the net contact area of the tread 32 when the tread is loaded onto a hard flat surface. The total area between the lateral edges 33A, 33B of the tread 32 as measured around the 360° circumference of the tread defines the gross area; the net area divided by the gross area defines the net to gross ratio.

For off-the-road tire, this is usually 50% or less. For agricultural tires the net to gross ratio is generally 30% or less, typically less than 25%.

These tread lugs 50 provide the traction for the tire. Each lug 50 has a leading edge side 52 and a trailing edge side 54. Normally these lugs are arranged within a directional pattern providing the optimum tractive capability as the tire rotates in a forward direction. The leading edge side 52 penetrates the soil and provides a surface, which pushes against the soil propelling the vehicle forward.

Figure 1:
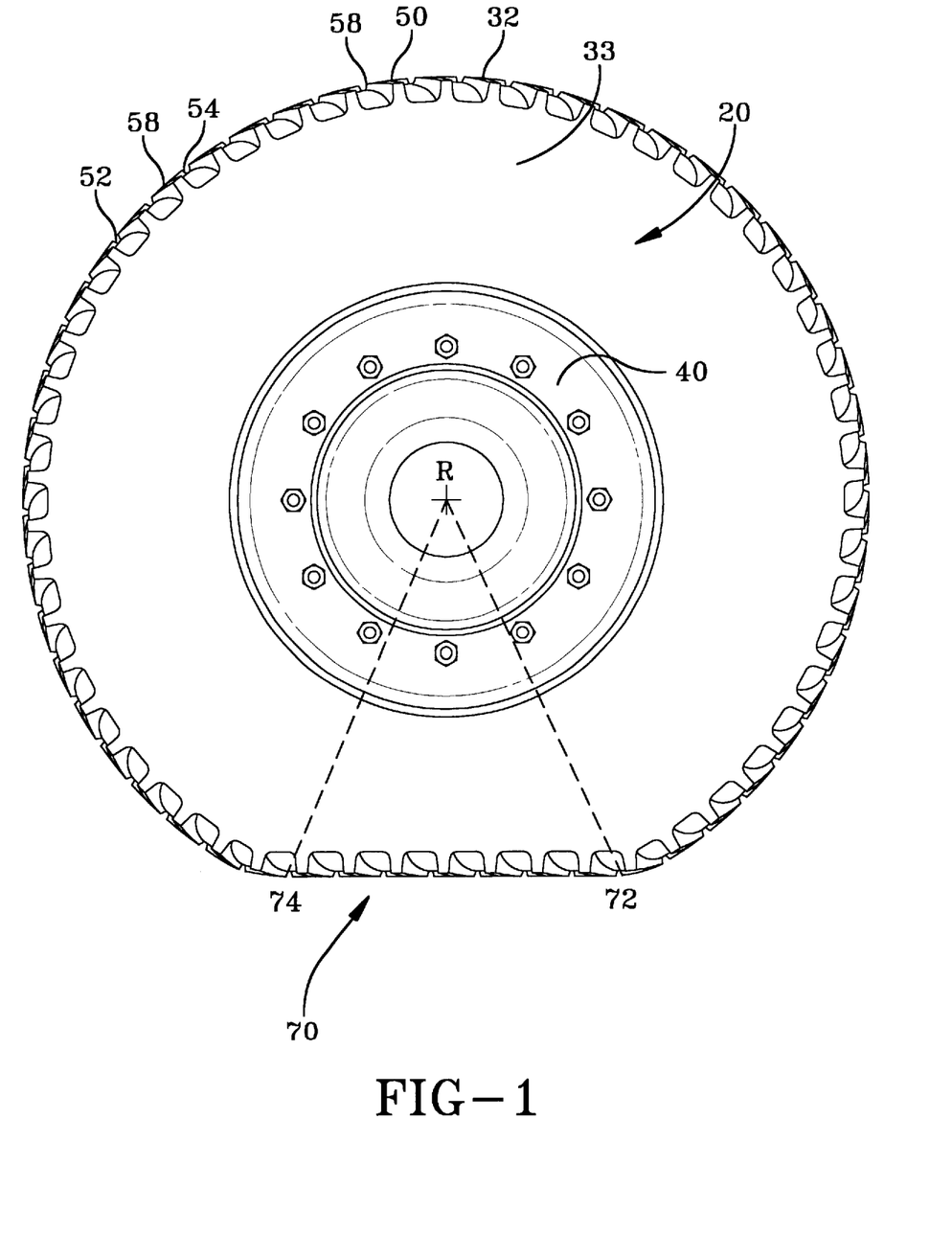
FIG. 1 is a side view of a first embodiment high aspect tire according to the invention.

As shown in FIG. 1, the tire 20 is illustrated in a condition simulating a soil working recommended inflated tire, the working inflation pressure under load is generally less than 16 psi (1.2 bar).

As shown in FIG. 2, the maximum section height of the tire 20 is shown as (SH). The measured section width is (SW), the aspect being SH/SW ratio. When this ratio is 95% or greater, preferably 100% or greater, several very beneficial performance characteristics can be seen.

First and potentially foremost is the contact patch or footprint of the tire can be made substantially longer than normal or lower aspect ratio tires. This is true partly because the load carrying capacity can be held constant while the working inflation pressure is lowered relative to the normal aspect ratio tires. This is due in part to the increased air volume in the taller sidewalls 33 of the tire 20 of the present invention.

This is possible even if the engineer keeps the outside diameter (OD) of the tire 20 constant and the section width (SW) substantially the same as the conventional aspect ratio tire. This is accomplished by lowering the nominal rim diameter of the tire 20, thus increasing the tire sidewall 33. Alternatively, the OD of the tire 20 can be increased, however, in many applications, the vehicle cannot accept larger OD tires.

As soon as the farmer can convert from conventional low aspect ratio tires to these inventive high aspect ratio tires, in addition to a longer footprint yielding more traction, he will reduce soil compaction because the same load is carried over more area creating a unit pressure drop between the tire and the soil as the tire rolls over the soil. This is most beneficial to reduce soil erosion and increasing crop yields.

A third benefit will be that the high aspect ratio tire will have a lower spring rate which will reduce the potential for "power hop" a phenomena wherein the tire when under load shears the soil at a point where the ability to resist the load is exceeded causing the tire to hop or bounce.

A fourth benefit is that the restrictive belt or breaker structure 26 in the high aspect ratio tire 20 does not appreciably restrict the carcass plies 22 from taking a natural inflated ply line. Conventional belts and breakers restrain the radial growth of the tire when it's inflated. This ply restraint was believed most beneficial to ride and handling performance at high speeds and has been, in principle, commonly applied to tractor or other off-road tires. This restriction of the plies from taking a more natural shape has resulted in numerous problems in the region near the belt edges causing high stresses and belt edge separations. For that reason the shorter sidewall normal aspect ratio tires are not well suited to operating at very low inflation pressures which only exacerbates the belt edge stresses. Whereas, the high aspect ratio tires 20 of the present invention have almost no or very much reduced stresses in the belt edges. This combined with the taller and thus more compliant sidewall 33 makes this inventive tire 20 ideal for low inflation pressure working conditions.

A problem of lateral stability of the tire 20 due to these tall sidewalls is addressed by variable belt or breaker angle control. Whereas normal aspect ratio radial agricultural tires have belt cord angles of 16° to 27° typically and bias tires have breaker cord angles of 25° to 65°. The inventors have found that an increase in angles of 2 or more degrees (i.e. 18° to 29° for radial tires, 27° to 67° for bias) above those normally used in a tire of a given outside diameter will sufficiently increase the lateral stability of the tire without unduly increasing shear stresses along the belt edges. These higher angle belts, when employed on low aspect ratio tires, increase this shear stress and thus such angles are routinely avoided.

One of the ways the engineer can design these high aspect ratio tires is to use the normal tires outside diameter and thus set the nominal rim diameter to fit the smaller sized rims currently available. Alternatively special rims of smaller nominal rim diameters can be made. Examples of using smaller conventional rims is shown below:

EXAMPLES

|  | Inches/cm | Rim Diameter Inches/cm | Aspect Ratio |
| --- | --- | --- | --- |
| Conventional Tire OD | 77.1/196 | 46/117 | 82 |
| High Aspect Tire OD | 77.1/196 | 38/96 | 104 |
| High Aspect Tire 2 OD | 77.1/196 | 34/86 | 114 |
| High Aspect Tire 3 OD | 77.1/196 | 30/76 | 125 |

These simple examples are shown to illustrate one application of the inventive concept. It is believed important that the nominal rim diameter be about 20 inches (51 cm) or more to insure there is enough tire to rim surface contact in the bead area to keep the tire 20 from slipping on the rim when subjected to high loads. Once the rim 40 becomes smaller than 20 inches (51 cm), the inventive concept should be used in combination with an improved mechanical attachment of the tire beads to the rim, to avoid tire slipping.

In radial ply tires, a neutral ply line is predicted at aspect ratio's of up to 106; at aspect ratio's above 106, the curvature of the ply path is no longer in a neutral ply path.

With reference to FIG. 1, the tire 20 when inflated to a specific working pressure of 16 psi (1.2 bar) or less exhibits a higher radial deflection of the tire under load than the lower aspect ratio tire similarly loaded. This high deflection elongates the contact patch or footprint 70 of the tire 20 such that the leading end 72 to trailing end 74 are circumferentially spaced the tire as shown in the FIG. 1. This distance is substantially greater than a conventional aspect ratio tire of the same outside diameter and section width. Thus the distance Y increases with increasing aspect ratios of tires of the same OD and section width.

These high aspect ratio tires 20 appear like large doughnut when unloaded, but when loaded the elongated footprint 70 is clearly noticeable. The tire 20 flattens in this compressed footprint zone providing a wide flat tread 32 to provide traction and high flotation. This makes the vehicle perform somewhat like a tracked vehicle. What is so beneficial is that all of the complicated mechanism associated with tracked vehicles is not needed while all of the benefits of pneumatic tires 20 are retained such as a soft shock absorbing ride.

Figure 3:
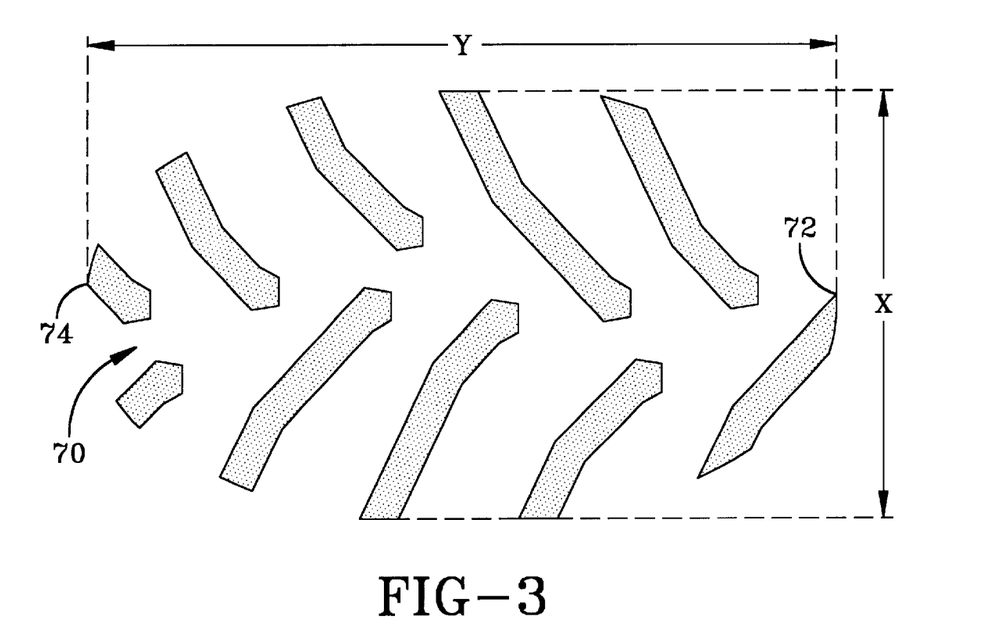
FIG. 3 is view of a contact patch of the high aspect tire, taken from FIG. 1.
Figure 4:
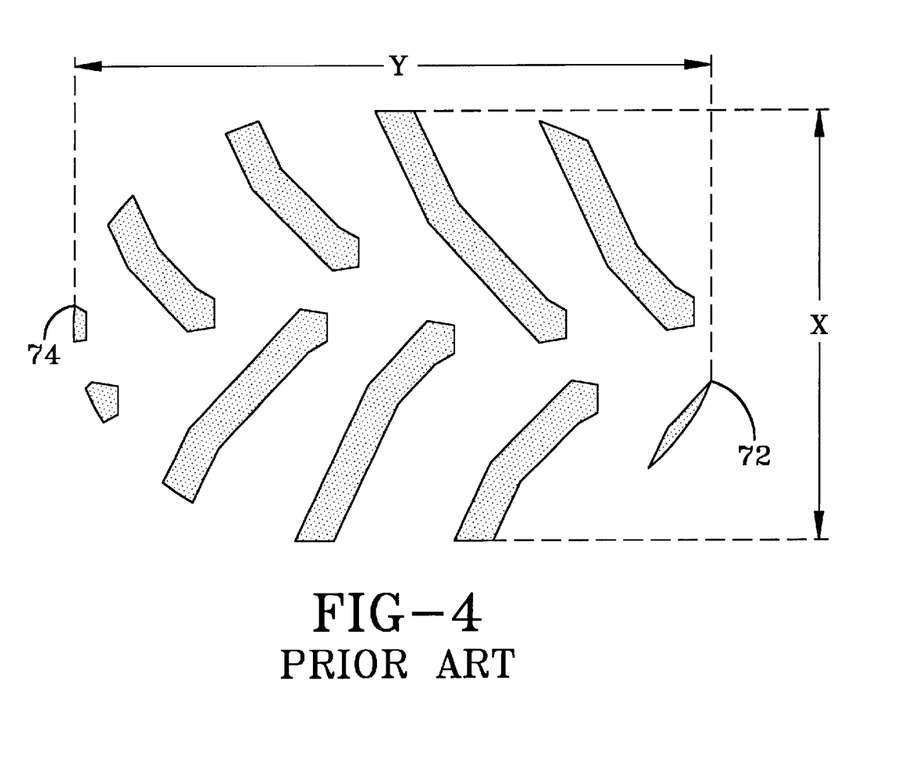
FIG. 4 is a plan view of a portion of the contact patch of a normal aspect ratio tire constructed similar to the tire of FIG. 1, but having an aspect ratio of less than 90%.
Figure 5:
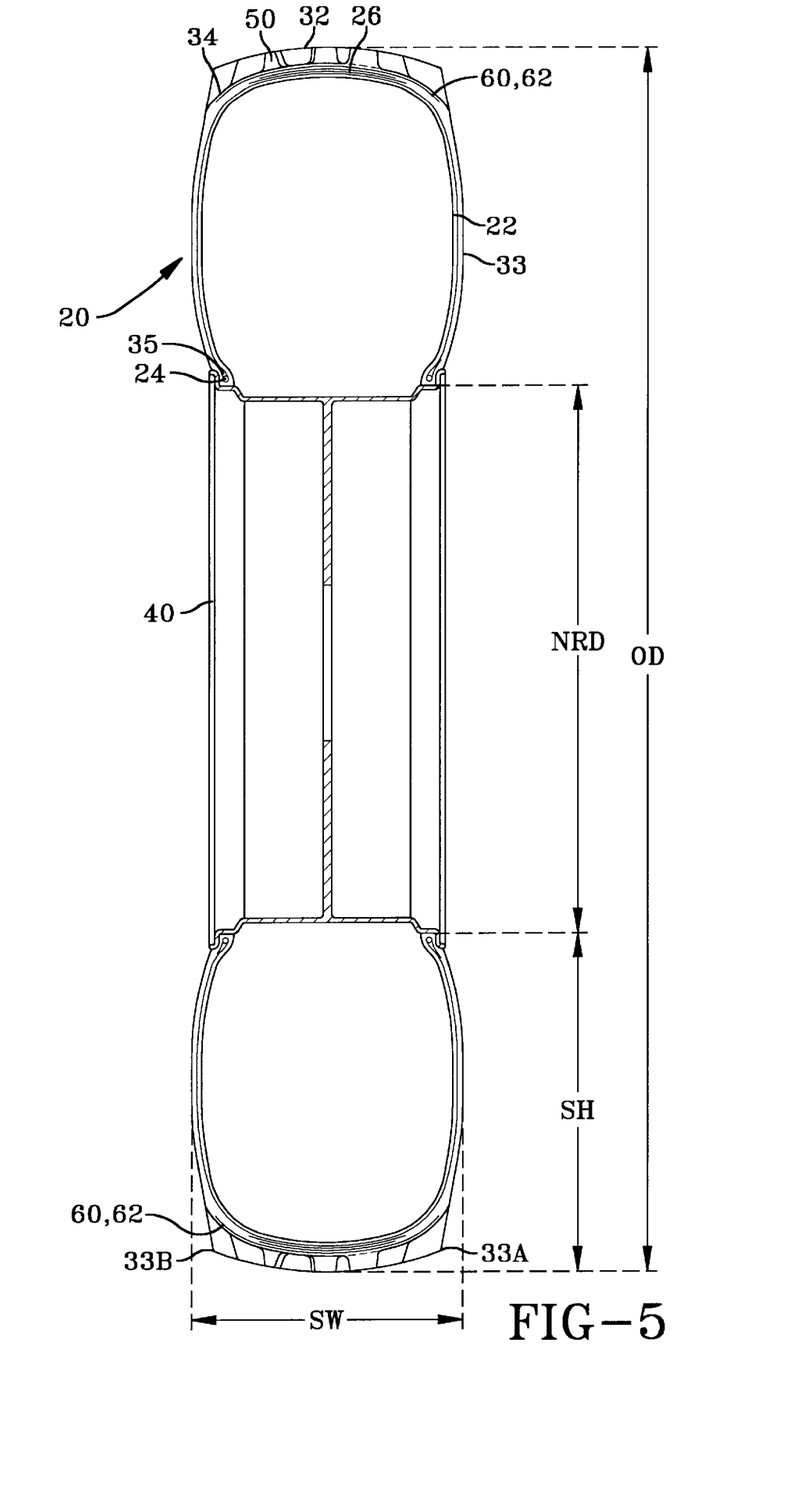
FIG. 5 is a perspective view of a second embodiment tire according to the invention.
Figure 6:
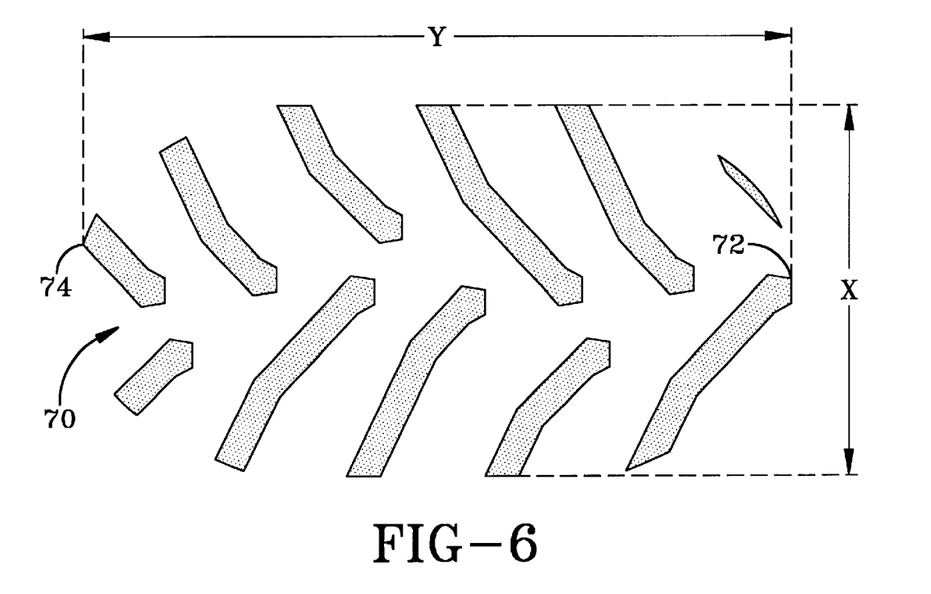
FIG. 6 is a plan view of a contact patch of the tire taken from FIG. 5.
Figure 7:
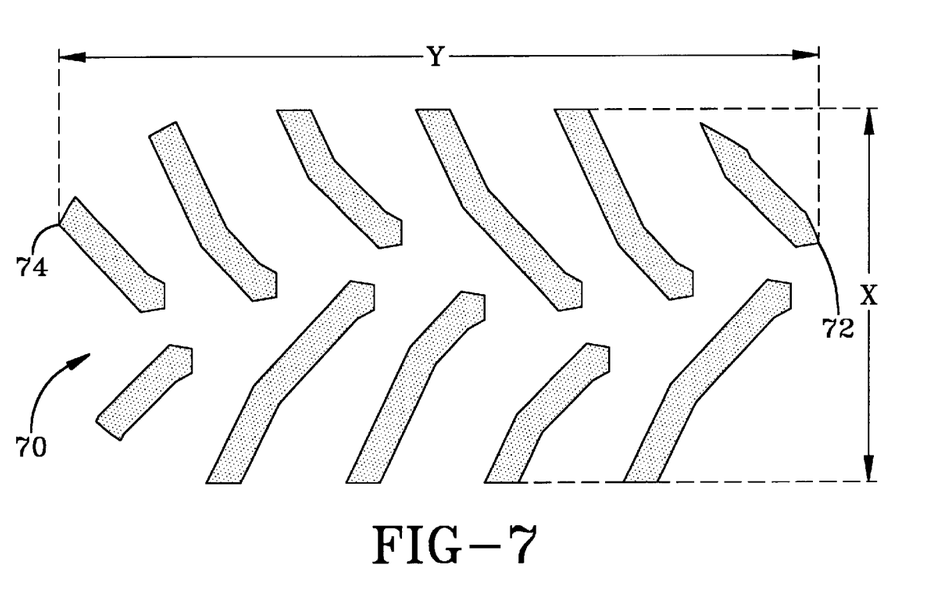
FIG. 7 is a plan view of a portion of the contact patch of the third embodiment tire according to the present invention.

With reference to FIG. 3, the contact patch 70 of a first embodiment high aspect ratio tire 20 is shown. FIG. 4 shows for comparison at the same load and pressures the footprint of a normal aspect ratio tire. FIGS. 6 and 7 are footprints 70 of second and third embodiment tires 20 each having aspect ratios of 114 and 125, respectively. As can be seen when inflated to a working pressure the contact patch 70 progressively increases in relation to the increasing aspect ratio. Furthermore, as the aspect ratio increased the load capacity increases when the working pressure is held constant. Thus for a constant or same load the farmer can further drop the working pressure from 12 to 9 psi (0.8 to 0.6 bar) to 9 or 6 psi (0.6 to 0.4 bar). This reduced working pressure further deflects the tire 20 and substantially increases the contact patch circumferential length Y. One of the objectives is to improve the contact patch length Y without changing appreciably the tire contact patch width X. As can be seen the relative length increase of Y in the circumferential direction is much greater than the increase in width of X and, therefore, the tires 20 are believed to have met this goal. The objective is to have the tire when inflated to less than 16 psi, to have a contact patch with axial width X and a circumferential length Y wherein the ratio of Y/X is greater than 1.

A key factor in lower pressure tires start when subjected to high torque loads the sidewall must transmit the torque from the rim 10 to the tread 32. In the embodiment of the invention where tall sidewalls 33 are employed, the benefit of a longer contact patch can be lost if the lugs 50 rotate or otherwise deflect under torque. The use of a low angle belt reinforcement 60 can minimize this problem. The tire 20 of the present invention uses cords 62 placed at 0° to 5° or less cord angle to reinforce the tread 32. Preferably, the cords 62 are positioned over the belt or breaker layers 26 and below the tread 32. The cords 62 of the low angle cord reinforced layer extend at least 360° around the circumference and can be in one single piece layer or may be used in multiple layers or strips of layers spirally wound over the belt or breaker reinforcement.

Preferably these cords 62 when positioned as a low angle reinforcement are made of nylon, aramid or steel cords or filaments. Most preferably the cords are designed to allow the carcass to elongate without undue restriction during the fabrication of the tire prior to vulcanization. The primary purpose of the low angle belt reinforcement is to increase torque transmission by creating a unique composite structure which includes the carcass plies 22 in the crown, the belt layers 26 above the crown, the low angle belt reinforcement layers 60 and the widely spaces elongated lugs 50. The resultant composite increases torque transmission because the zero to 5° cords 62 generate very strong circumferential tensioning making the lugs 50 act very rigidly when in the contact patch.

To make the tire it has been found that circumferential restriction can be kept to a minimum by having the cords designed to provide a sufficient amount of circumferential expansion during tire assembly. This is accomplished by having the cords designed to accommodate a limited amount of stretching in the circumferential direction.

Figure 8:
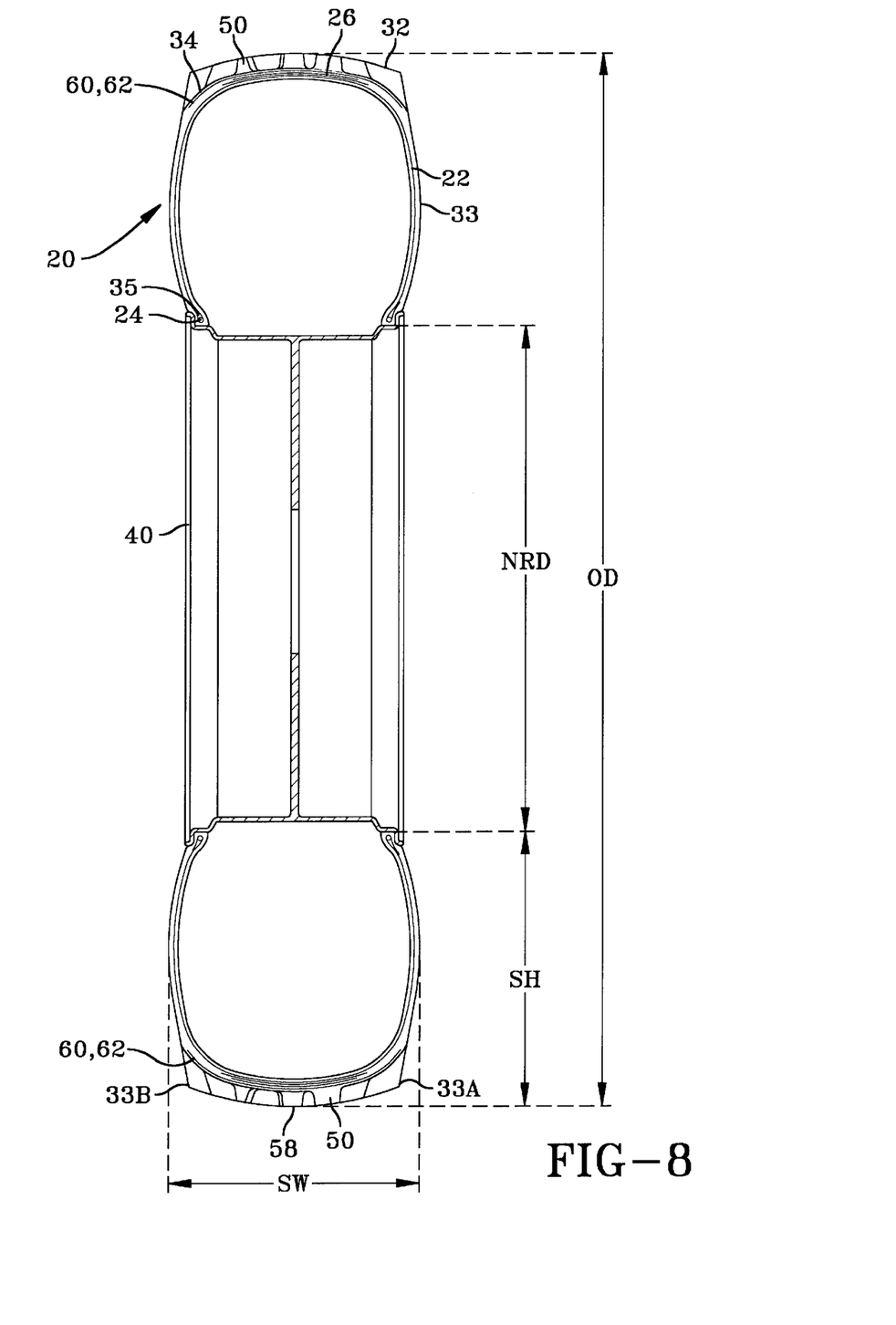
FIG. 8 is a cross-sectional view of a low or normal aspect ratio tire made in accordance to the invention.

Alternatively, should the tire designer wish to restrict the circumferential growth of the tire as is more typically the case in lower aspect farm tires as shown in FIG. 8, then the low angle belt reinforcement structure 60 can be used to achieve that result as well. In that case, the benefits of increased rigidity of the lugs 50 and superior torque absorbing capacity will be achieved as well.

Another example of the use of the low angle belt reinforcement 60 for a low pressure tire having elongated lugs 50 would be the ATV tires currently being sold for agricultural as well as recreational purposes.

In each of the embodiments suggested, the tires will not only improve torque performance, but they have better dimensional stability and tolerances as a result of the low angle belt reinforcing layer. The overall composite structure greatly enhances the performance of these types of low net-to-gross ratio tires where speed is actually secondary to workload capacity and drawbar traction.

What is claimed is:

1. A high aspect ratio low pressure pneumatic farm tire for off-road use on the drive axle of a tractor having a nominal rim diameter greater than 20 inches and a carcass, the carcass having a radially outer crown portion and being reinforced with one or more cord reinforced plies, the tire comprising:

a circumferentially extending tread reinforcement composite structure including a tread having a plurality of widely spaced elongated lugs, each lug having a radial height (h) and a width (w), (w) being less than (h), where the elongated lugs are inclined relative to the circumferential direction at an angle equal to or greater than 30°, a belt or breaker reinforcement having two or more cord reinforced layers with cords oriented at an angle of 18° or greater relative to the circumferential direction, and one or more low angle cord reinforced layers interposed between the belt or breaker reinforcement and the tread, each low angle cord reinforced layer having cords oriented in the 0° to 5° range relative to the circumferential direction, the cords of the low angle cord reinforced layer or layers extending at least 360° around the tire circumference over the belt or breaker reinforcement; and wherein the tread has a net-to-gross ratio as measured around the circumference of the tread of less than 30%, and the tire has an aspect ratio of 95% or greater wherein the one or more low angle cord reinforced layers have cords made of steel.

2. The low pressure pneumatic tire for off-road use of claim 1 wherein the cords of the belt or breaker reinforcement are made of steel.

3. A high aspect ratio low pressure pneumatic farm tire for off-road use on the drive axle of a tractor having a nominal rim diameter greater than 20 inches and a carcass, the carcass having a radially outer crown portion and being reinforced with one or more cord reinforced plies, the tire comprising:

a circumferentially extending tread reinforcement composite structure including a tread having a plurality of widely spaced elongated lugs, each lug having a radial height (h) and a width (w), (w) being less than (h), where the elongated lugs are inclined relative to the circumferential direction at an angle equal to or greater than 30°, a belt or breaker reinforcement having two or more cord reinforced layers with cords oriented at an angle of 18° or greater relative to the circumferential direction, and one or more low angle cord reinforced layers interposed between the belt or breaker reinforcement and the tread, each low angle cord reinforced layer having cords oriented in the 0° to 5° range relative to the circumferential direction, the cords of the low angle cord reinforced layer or layers extending at least 360° around the tire circumference over the belt or breaker reinforcement; and wherein the tread has a net-to-gross ratio as measured around the circumference of the tread of less than 30%, and the tire has an aspect ratio of 95% or greater wherein the one or more low angle cord reinforced layers have cords made of aramid.

4. The low pressure pneumatic tire for off-road use of claim 3 wherein the cords of the belt or breaker reinforcement are made of steel.

* * * * *